US012807043B2

(12) United States Patent
Madhu et al.

(10) Patent No.: US 12,807,043 B2
(45) Date of Patent: Nov. 24, 2026

(54) SEAT ASSEMBLY AND CORRESPONDING LATCH

(71) Applicant: Lear Corporation, Southfield, MI (US)

(72) Inventors: Adarsha Madhu, Novi, MI (US); Stephen Redwood, Flat Rock, MI (US)

(73) Assignee: Lear Corporation, Southfield, MI (US)

( * ) Notice: Subject to any disclaimer, the term of this patent is extended or adjusted under 35 U.S.C. 154(b) by 110 days.

(21) Appl. No.: 18/815,407

(22) Filed: Aug. 26, 2024

(65) Prior Publication Data

US 2026/0054612 A1 Feb. 26, 2026

(51) Int. Cl.
*B60N 2/08* (2006.01)

(52) U.S. Cl.
CPC .................................... *B60N 2/085* (2013.01)

(58) Field of Classification Search
CPC .. B60N 2/0831; B60N 2/0837; B60N 2/0843; B60N 2/085
See application file for complete search history.

(56) References Cited

U.S. PATENT DOCUMENTS 5,383,710 A 1/1995 Premji
6,869,143 B2 * 3/2005 Secord .................. B60N 2/224 297/367 R
9,573,493 B2 * 2/2017 Nagura ................ B60N 2/2236
9,701,222 B2 * 7/2017 Kitou ..................... B60N 2/236
10,279,709 B2 * 5/2019 Suzuki ................. B60N 2/2356
10,647,236 B2 5/2020 Kish et al.
11,072,263 B2 7/2021 Madhu et al.
11,850,975 B2 * 12/2023 Ansari ................. B60N 2/2255
2010/0052394 A1 * 3/2010 Heeg ...................... B60N 2/366 297/378.13
2015/0266398 A1 * 9/2015 Higashi ................ B60N 2/2356 297/367 R
2016/0009198 A1 * 1/2016 Yaguchi ............. B60N 2/01583 296/63
2016/0214506 A1 * 7/2016 Mueller ................. B60N 2/366
2017/0080828 A1 * 3/2017 Aktas .................... F16C 19/163
2020/0247284 A1 * 8/2020 Yaguchi ............... B60N 2/3011
2021/0276461 A1 * 9/2021 Schmitz ............... B60N 2/2356

* cited by examiner

*Primary Examiner* — Chi Q Nguyen
(74) *Attorney, Agent, or Firm* — Alston & Bird LLP

(57) ABSTRACT

A product includes a first cam and a second cam. The first cam is supported upon one of a seat bottom and a seat base. The seat bottom is pivotal relative to the seat base. The first cam comprises a cam surface defined along an outer periphery of the first cam. The cam surface defines a recessed region. The cam surface comprises a protruding tip extending from the recessed region. The second cam is supported upon the other of the seat bottom and the seat base. The protruding tip is operable to engage the second cam to latch the second cam to the first cam in an engaged position.

18 Claims, 4 Drawing Sheets

SEAT ASSEMBLY AND CORRESPONDING LATCH

TECHNICAL FIELD

This relates to a seat assembly and a corresponding latch for the seat assembly.

DETAILED DESCRIPTION

Figure 2:
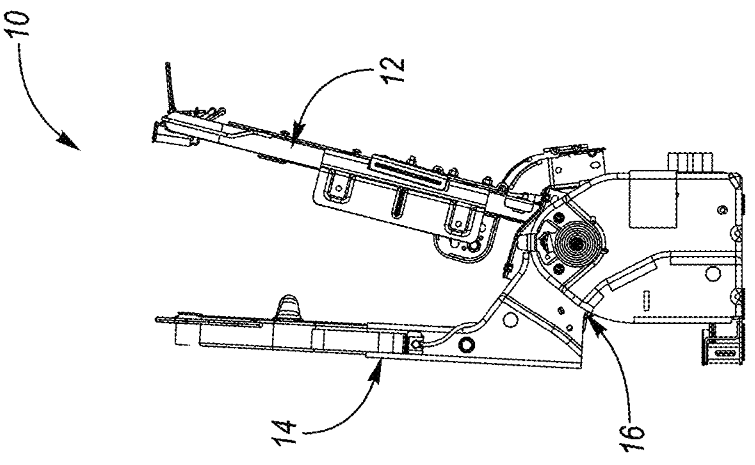
FIG. 2 shows a side view of the seating system with a seat bottom in a stowed position.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising" when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
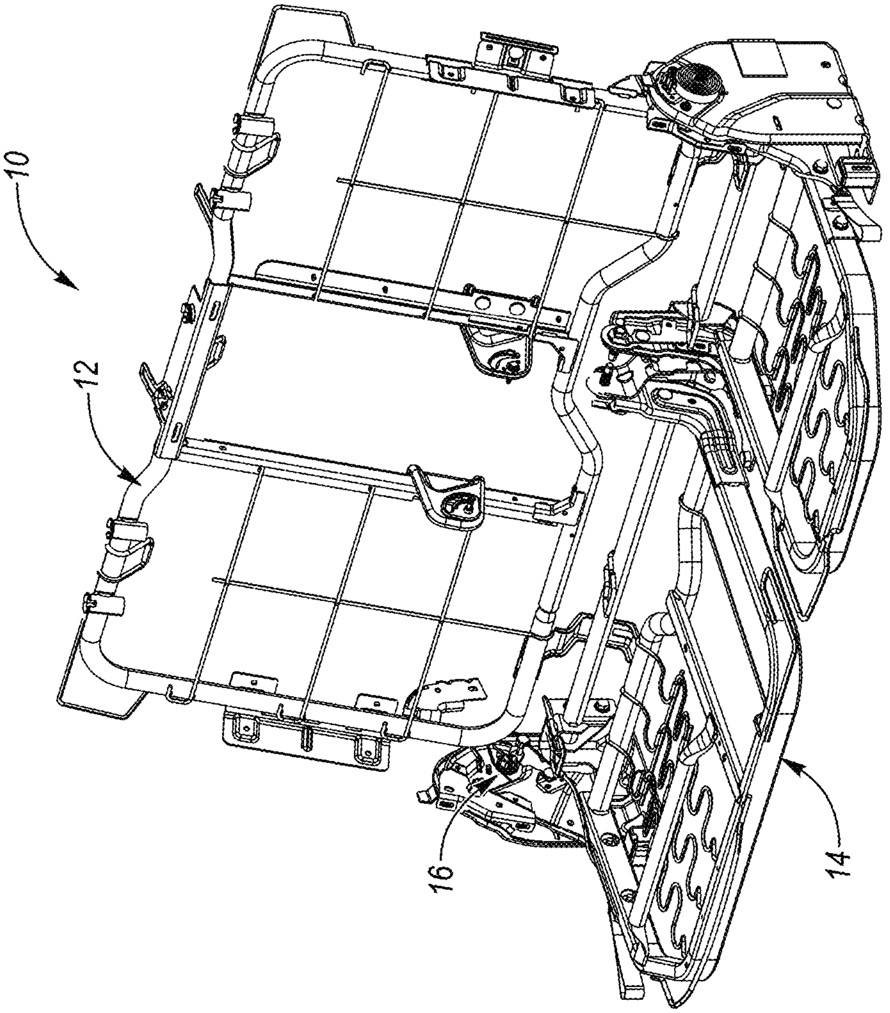
FIG. 1 shows a perspective view of a seating system for vehicle in accordance with embodiments described herein.
Figure 3:
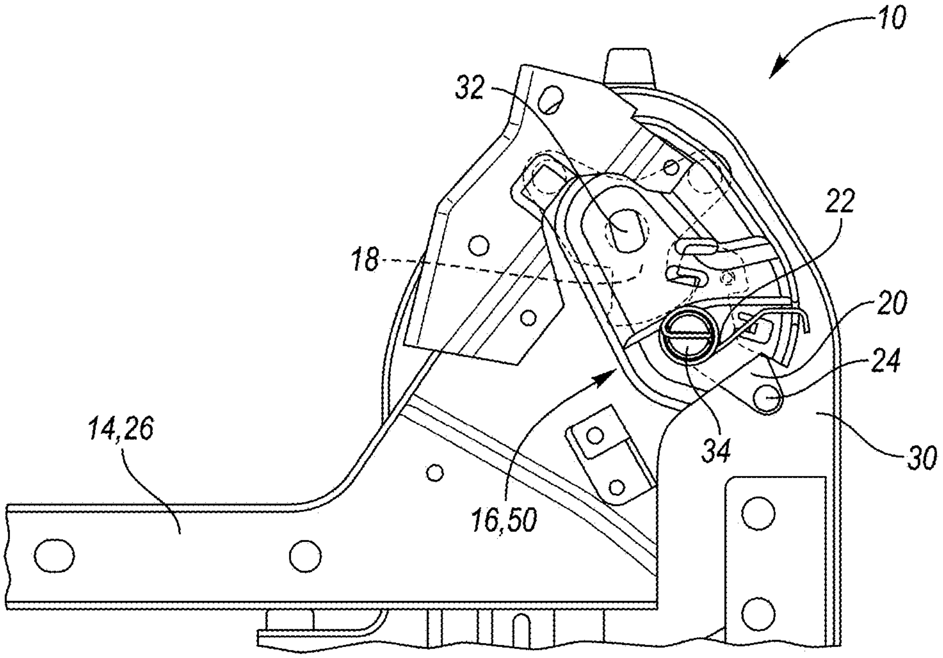
FIG. 3 is a side view of the seating system illustrating the seat bottom in a deployed position.
Figure 4:
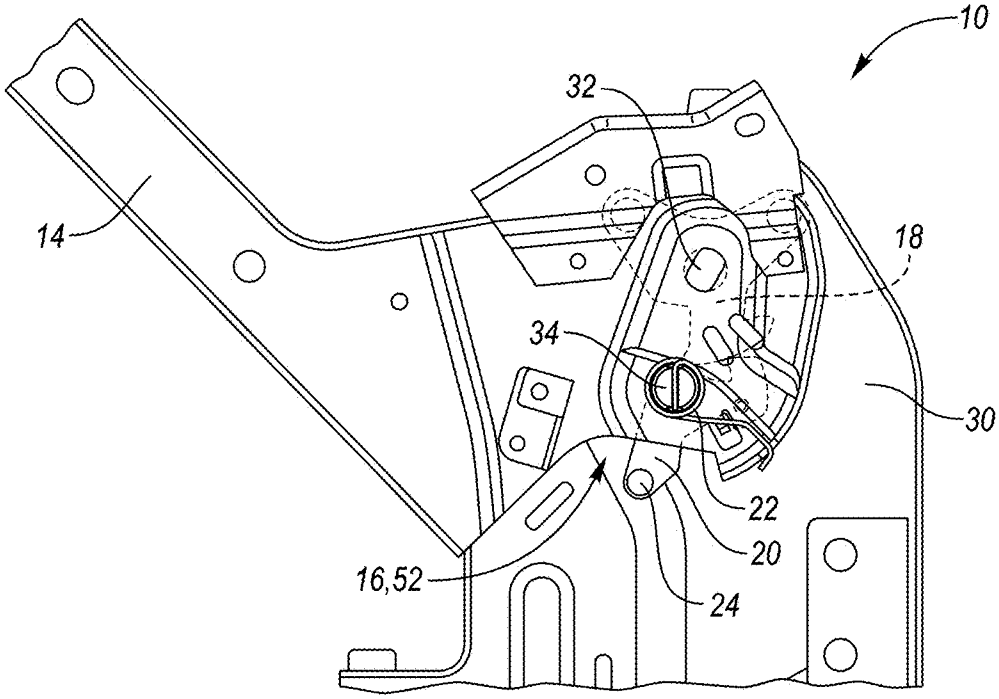
FIG. 4 is a side view of the seating system illustrating the seat bottom during a transition between the deployed position and a stowed position.
Figure 5:
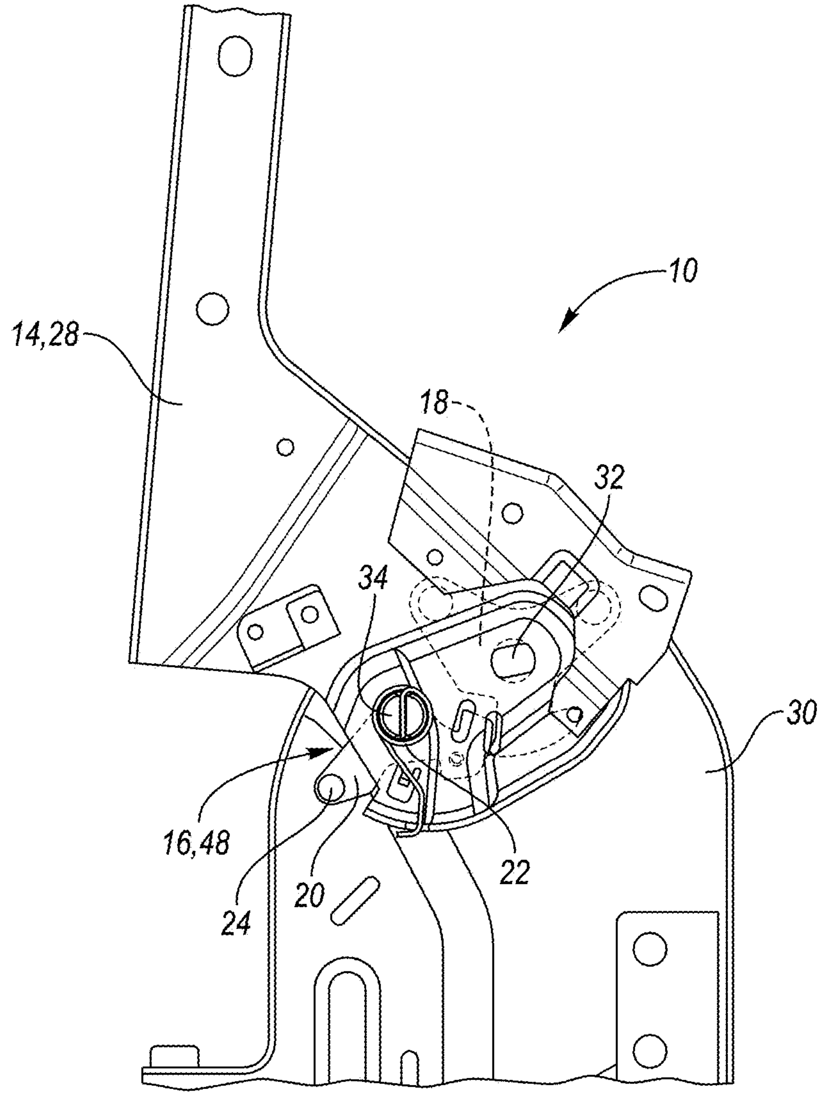
FIG. 5 is a side view of the seating system illustrating the seat bottom in the stowed position.
Figure 6:
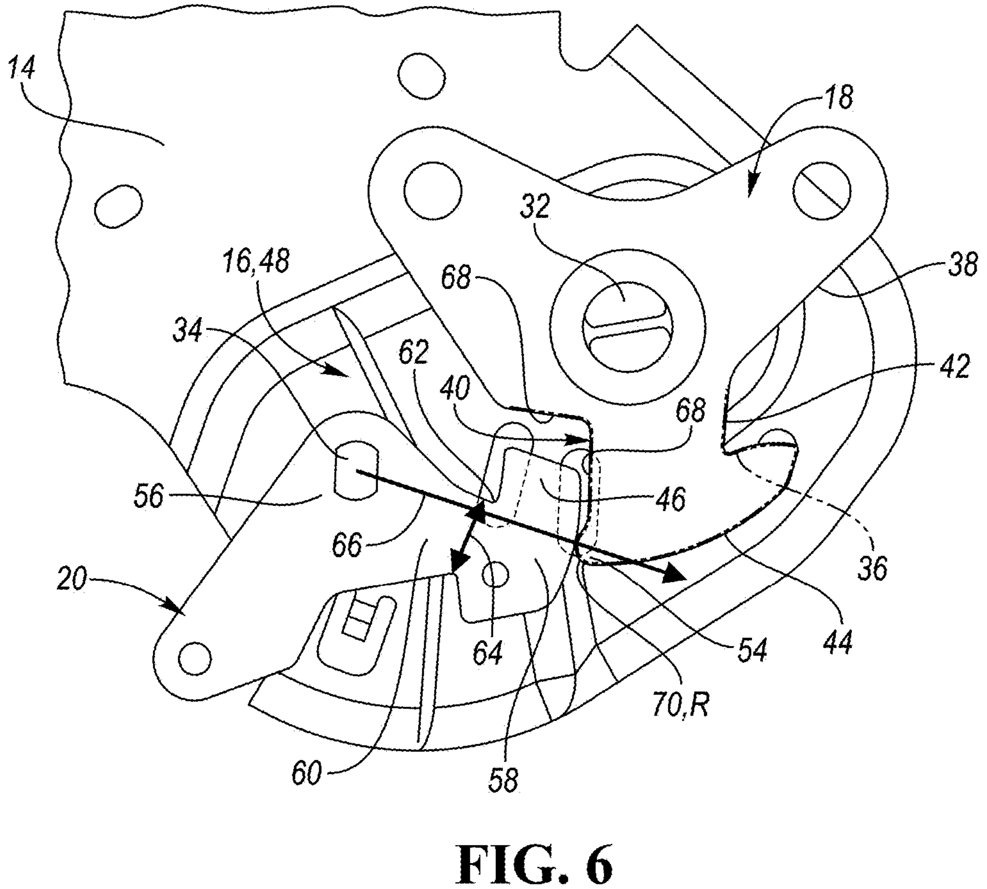
FIG. 6 is a side view of a latching system that is operable to secure the seat bottom in either the deployed position or the stowed position.

FIG. 1 shows a seating system 10 for a vehicle. The seating system 10 is a bench seat having multiple seating sections. The seating system 10 includes a seat back 12 and a seat bottom 14, each of which may be split to separately accommodate the two seating sections of the bench seat. As shown in FIGS. 1 and 2, the seat bottom 14 is attached to and selectively rotatable between a design position and a stowed position—shown in FIG. 1 and FIG. 2, respectively. In other embodiments, a seat bottom may not be attached to a seat back, but may be mounted to a floor or other frame structure of the vehicle, while the seat back is independently mounted to the floor or other frame structure of the vehicle.

As shown in FIGS. 1 and 2, the design position is when the seat bottom 14 is generally horizontal and is in a position (e.g., a deployed position) to accept a seated occupant, and the stowed position is when the seat bottom 14 is generally vertical and is not in position to accept a seated occupant. The stowed position shown in FIG. 2 of the seat bottom 14 is sometimes called a "stadium position". Also shown in the drawing figures is that the seating system 10 includes a latch 16, which is configured to selectively inhibit or facilitate movement of the seat bottom 14 between the deployed and stowed positions. Although FIGS. 1 and 2 illustrate a bench seat having multiple seating sections, the seating system 10 may include any type of seating system having one or more seating sections that are configured to transition to a "stadium position."

Referring to FIGS. 3-6, the seating system 10, and in particular, the latch 16 is illustrated in more detail. The seating system 10 or any components or subsystem for the seating system 10 (e.g., the latch 16) may be referred to as a product. The latch 16 includes a first cam 18, which may be referred to as a fixed sector. The latch 16 also includes a second cam 20, which may be referred to as a as blocker cam. A torsion spring 22 imparts a torque to the second cam 20. The torsion spring 22 may impart torque to the second cam 20 such that the second cam 20 is biased into engagement with the first cam 18. In the illustrated example of FIGS. 3-5, the torque imparted by the torsion spring 22 is in a counterclockwise direction. A handle or lever 24 secured to the second cam 20 may be engaged by a user to release the second cam 20 from the first cam 18 to facilitate a transition of the seat bottom 14 between the deployed position 26 (e.g., FIG. 3) and the stowed position 28 (e.g., FIG. 5). The lever 24 may be directly engaged by a user or may be attached to an actuator via a cable. As described in more detail below, the actuator is operable to release the latch 16 from a locking position to a released, or unlocked position.

In general, an actuator, such as part of a latch arrangement in accordance with embodiments described herein, may be operable to move at least one of a cam or support structure between engaged and disengaged positions. As applied to the embodiments illustrated herein, a first of the engaged positions may correspond to the first locking position of the latch 16 (e.g., FIG. 5), a second of the engaged positions may correspond to the second locking position of the latch 16 (e.g., FIG. 3), and the disengaged position may correspond to the unlocked position of the latch 16 (e.g., FIG. 4). The cable may be attached to a manually-operated lever or button forming a part of the actuator and which can be operated to apply a tension to the cable to move the second cam 20 against the action of the torsion spring 22. Other actuators may also be used, including automatic or motor-driven actuators and those that do not use cables.

The first cam 18 is illustrated as being secured to, affixed to, or supported upon a seat base 30. The seat base 30 may correspond to a portion of the seat frame that is mounted to a vehicle frame. The first cam 18 may not move relative to the seat base 30. The second cam 20 is illustrated as being rotatably secured to or supported upon the seat bottom 14. The seat bottom 14 is pivotal relative to the seat base 30. The seat bottom 14 may more specifically be pivotably secured to the seat base 30. The seat back 12 may also be coupled to or secured to the seat base 30. The seat bottom 14 may pivot about a first pivot point 32 (e.g., a first pivot pin) relative to the seat base 30 to transition between the deployed position 26 (e.g., FIG. 3) and the stowed position 28 (e.g., FIG. 5). The second cam 20 is configured to move and pivot along with the seat bottom 14 about the first pivot point 32 between the deployed position 26 and the stowed position 28. The second cam 20, however, is also configured to pivot about a second pivot point 34 (e.g., a second pivot pin) relative to the seat bottom 14 to engage the first cam 18 (e.g., FIGS. 3 and 5), and disengage the second cam 20 (e.g., FIG. 4). In an alternative configuration, the first cam 18 may be secured to or supported on the seat bottom 14 while the second cam 20 is secured to or supported on the seat base 30.

The seat bottom 14 is operable to pivot upward relative to the seat base 30 to transition to the stowed position 28. The seat bottom 14 is also operable to pivot upward and toward the seat back 12 to transition to the stowed position 28. The seat bottom 14 is operable to pivot downward relative to the seat base 30 to transition to the deployed position 26. The seat bottom 14 is also operable to pivot downward and away from the seat back 12 to transition to the deployed position 26.

The first cam 18 includes a cammed surface or cam surface 36 defined along an outer periphery 38 of the first cam 18. The cam surface 36 may defined along a portion of the outer periphery 38 as illustrated or may be defined along the entire outer periphery 38. The cam surface 36 defines a first recessed region 40, a second recessed region 42, and an edge 44 extending between the first recessed region 40 and the second recessed region 42. The second cam 20, or more specifically a hook 46 of the second cam 20, is operable to engage the first cam 18 in the first recessed region 40 to secure, latch, or lock the seat bottom 14 in the stowed position 28 (e.g., FIGS. 5 and 6). The second cam 20 engaging the first cam 18 in the first recessed region 40 may be referred to as the first latched, locked, or engaged position 48 between the second cam 20 and the first cam 18, or as the first latched, locked, or engaged position of the latch 16 as a whole. The second cam 20, or more specifically the hook 46 of the second cam 20, is operable to engage the first cam 18 in the second recessed region 42 to secure, latch, or lock the seat bottom 14 in the deployed position 26 (e.g., FIG. 3). The second cam 20 engaging the first cam 18 in the second recessed region 42 may be referred to as the second latched, locked, or engaged position 50 between the second cam 20 and the first cam 18, or as the second latched, locked, or engaged position of the latch 16 as a whole.

The second cam 20, or more specifically the hook 46 of the second cam 20, is operable to disengage the first cam 18 during a transition of the seat bottom 14 between the deployed position 26 and the stowed position 28. The second cam 20 disengaging the first cam 18 may be referred to as an unlatched, unlocked, or disengaged position 52 between the second cam 20 and the first cam 18, or as an unlatched, unlocked, or disengaged position of the latch 16 as a whole. The edge 44 may operate as a guide to drive or steer the second cam 20 toward either the first recessed region 40 or the second recessed region 42 while the second cam 20 is disengaged from the first cam 18 and is moving between the first recessed region 40 and the second recessed region 42 along the edge 44.

The cam surface 36 comprises a protruding tip 54 extending from the first recessed region 40 region. The protruding tip 54 is operable to engage the second cam 20 to latch or lock the second cam 20 to the first cam 18 in the first engaged position 48 and secured the seat bottom 14 in the stowed position 28. The second cam 20 comprises a pivoting region 56 that may be connected to the second pivot point 34, a head region 58 that may include the hook 46, and a neck region 60 extending between the pivoting region 56 and head region 58. The second cam 20 also defines or comprises a notch 62 along the neck region 60. The notch 62 is also positioned between the pivoting region 56 and head region 58.

The neck region 60 also comprises a dimension 64 that is sized such that a force (represented by arrow 66 in FIG. 6) extending from the pivoting region 56 (or more specifically extending from the second pivot point 34) to the protruding tip 54 via an engagement between the first cam 18 and second cam 20 in the first engaged position 48 while the seat bottom 14 is in the stowed position 28 spans the neck region 60 and the head region 58. The dimension 64 is also sized such that the force 66 extending from the pivoting region 56 (or more specifically extending from the second pivot point 34) to the protruding tip 54 via an engagement between the first cam 18 and second cam 20 in the first engaged position 48 while the seat bottom 14 is in the stowed position 28 does not span the notch 62. The first dimension 64 may correspond to a width of the neck region 60 along a narrowest sector of the neck region 60.

The protruding tip 54 extends from the first recessed region 40 along the outer periphery 38 of the first cam 18. The first recessed region 40 comprises edges 68 and the protruding tip 54 protrudes or extends from one of the edges 68. The protruding tip 54 comprises a rounded outer edge 70 defining a radius R. The protruding tip 54, or more specifically, the rounded outer edge 70 of the protruding tip 54 may engage the first cam 18 via a line contact or via a point contact.

The force 66 correspond to the force extending through the second cam 20 and into the first cam 18 when the seat bottom 14 is in the stowed position 28. The force 66 may correspond to a force applied due to gravity pulling down the seat bottom 14 or due to external loads (e.g., loads experienced while driving). The arrangement described herein prevents the force 66 from operating as a cantilevered force, which would be the case if the force 66 were to span the notch 62. Instead, the force 66 does not span any notch or gap defined by the second cam 20, which results in the force 66 being a column force that is applied to the second cam 20, which in turn results in a more robust configuration (particularly with regard to the second cam 20) that is capable of withstanding larger loads when compared to an arrangement where a cantilevered force is applied to the second cam 20.

Clause 1. A product comprising: a first cam, the first cam supported upon one of a seat bottom and a seat base, wherein the seat bottom is pivotal relative to the seat base, the first cam comprising a cam surface defined along an outer periphery of the first cam, wherein the cam surface defines a recessed region, and wherein the cam surface comprises a protruding tip extending from the recessed region; and a second cam, the second cam supported upon the other of the seat bottom and the seat base, wherein the protruding tip is operable to engage the second cam to latch the second cam to the first cam in an engaged position.

Clause 2. The product of clause 1, wherein latching the second cam to the first cam in the engaged position locks the seat bottom in a stowed position.

Clause 3. The product of clause 1 to 2, wherein the seat bottom is operable to pivot upward relative to the seat base to the stowed position.

Clause 4. The product of clause 1 to 4, wherein the second cam is movable and operable to latch the second cam to the first cam in a second engaged position.

Clause 5. The product of clause 4, wherein latching the second cam to the first cam in the second engaged position locks the seat bottom in a deployed position.

Clause 6. The product of clause 5, wherein the seat bottom is operable to pivot downward relative to the seat base to the deployed position.

Clause 7. The product of clause 1 to 6, wherein the second cam comprises a pivoting region, a head region, and a neck region extending between the pivoting region and head region.

Clause 8. The product of clause 7, wherein the neck region comprises a dimension sized such that a force extending from the pivoting region to the protruding tip via an engagement between the first cam and second cam spans the neck region and the head region.

Clause 9. The product of clause 7 to 8, wherein the second cam comprises a notch along the neck region and between the pivoting region and head region.

Clause 10. The product of clause 9, wherein the neck region comprises a dimension that is sized such that a force extending from the pivoting region and to the protruding tip via an engagement between the first cam and second cam does not span the notch.

Clause 11. The product of clause 1 to 10, wherein the protruding tip extends from the recessed region along an outer periphery of the first cam.

Clause 12. The product of clause 1 to 11, wherein the recessed region comprises edges and the protruding tip protrudes from one of the edges.

Clause 13. The product of clause 1 to 12, wherein the protruding tip comprises a rounded outer edge defining a radius.

Clause 14. The product of clause 1 to 13 further comprising a seat back coupled to the seat base.

Clause 15. The product of clause 14, wherein the seat bottom is rotatable upward and toward the seat back to transition to a stowed position.

Clause 16. The product of clause 14 to 15, wherein the seat bottom is rotatable downward and away from the seat back to transition a deployed position.

Clause 17. The product of clause 1 to 16, wherein the first cam is affixed to the seat base.

Clause 18. The product of clause 1 to 17, wherein the second cam is rotatably secured to the seat bottom.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A seat, comprising:

a seat bottom;

a seat base pivotable relative to the seat base;

a first cam, the first cam supported upon one of the seat bottom or the seat base, the first cam comprising a cam surface defined along an outer periphery of the first cam, wherein the cam surface defines a recessed region, and wherein the cam surface comprises a protruding tip extending from the recessed region; and a second cam, the second cam supported upon the other of the seat bottom or the seat base, wherein the protruding tip is operable to engage the second cam to latch the second cam to the first cam in an engaged position.

2. The seat of claim 1, wherein latching the second cam to the first cam in the engaged position locks the seat bottom in a stowed position.

3. The seat of claim 2, wherein the seat bottom is operable to pivot upward relative to the seat base to the stowed position.

4. The seat of claim 1, wherein the second cam is movable and operable to latch the second cam to the first cam in a second engaged position.

5. The seat of claim 4, wherein latching the second cam to the first cam in the second engaged position locks the seat bottom in a deployed position.

6. The seat of claim 5, wherein the seat bottom is operable to pivot downward relative to the seat base to the deployed position.

7. The seat of claim 1, wherein the second cam comprises a pivoting region, a head region, and a neck region extending between the pivoting region and head region.

8. The seat of claim 7, wherein the neck region comprises a dimension sized such that a force extending from the pivoting region to the protruding tip via an engagement between the first cam and second cam spans the neck region and the head region.

9. The seat of claim 7, wherein the second cam comprises a notch along the neck region and between the pivoting region and head region.

10. The seat of claim 9, wherein the neck region comprises a dimension that is sized such that a force extending from the pivoting region and to the protruding tip via an engagement between the first cam and second cam does not span the notch.

11. The seat of claim 1, wherein the protruding tip extends from the recessed region along an outer periphery of the first cam.

12. The seat of claim 1, wherein the recessed region comprises edges and the protruding tip protrudes from one of the edges.

13. The seat of claim 1, wherein the protruding tip comprises a rounded outer edge defining a radius.

14. The seat of claim 1 further comprising a seat back coupled to the seat base.

15. The seat of claim 14, wherein the seat bottom is rotatable upward and toward the seat back to transition to a stowed position.

16. The seat of claim 14, wherein the seat bottom is rotatable downward and away from the seat back to transition a deployed position.

17. The seat of claim 1, wherein the first cam is affixed to the seat base.

18. The seat of claim 1, wherein the second cam is rotatably secured to the seat bottom.

* * * * *